Feb. 24, 1948.  B. D. COHN  2,436,631
COMBINED GRAVE/MARKER AND FLOWER HOLDER
Filed July 9, 1946
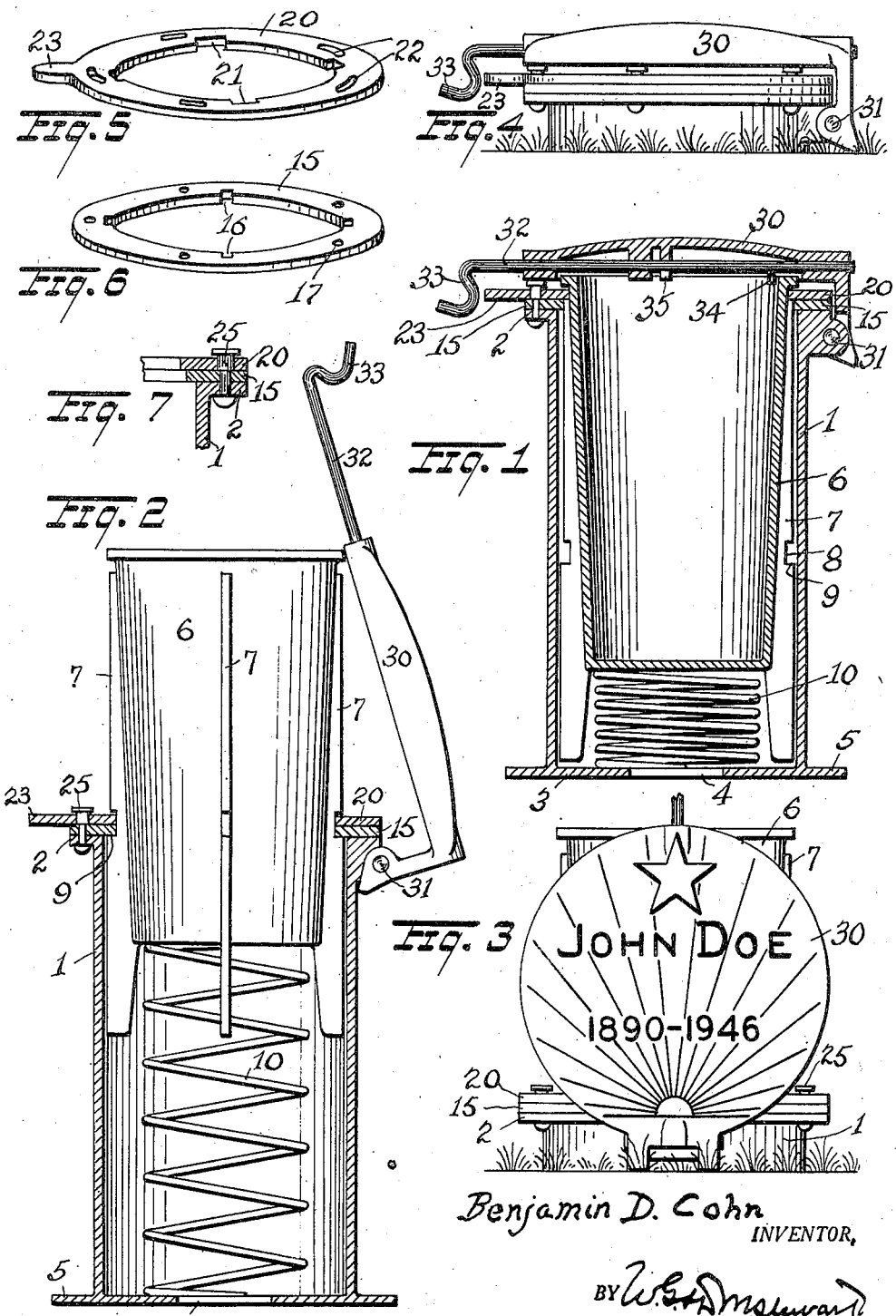
Benjamin D. Cohn
INVENTOR.
BY W.G.A.M...
Attorneys.

Patented Feb. 24, 1948 2,436,631

UNITED STATES PATENT OFFICE 2,436,631

COMBINED GRAVE MARKER AND FLOWER HOLDER

Benjamin D. Cohn, Pennside, Pa.

Application July 9, 1946, Serial No. 682,433

3 Claims. (Cl. 47—41)

This invention relates to a combined grave marker and flower holder, and more particularly to a device for such purpose having an open top casing adapted to be sunk into the ground with a marker lid for closing said open top hinged to said casing, and a container vessel for flowers or the like vertically movable in said casing from lowered position within said casing beneath the closed lid or to raised position projecting above said open top when the lid is lifted.

And the main objects of the present improvements are to provide novel guide means for vertical movement of said container vessel with manually operated locking means for securing said vessel in retracted position within said casing, and in raised projecting position above said casing open top. Other important objects are to provide spring tension means to facilitate projection of said container vessel, means to prevent removal of said vessel from said container, and a convenient handle for the hinged lid adapted to be extended to form a supporting hooked bracket for wreaths, baskets and the like.

Having the above objects in mind, the present invention comprises the improved constructions hereinafter fully described in connection with the accompanying drawings, and the novel features thereof are specifically defined in the appended claims.

In the drawings,

Fig. 1 is a transverse sectional elevation of a combined grave marker and flower holder showing a preferred complete embodiment of the present improvements.

Fig. 2 is a similar view to Fig. 1, with the hinged lid and container vessel shown in full side elevation and in raised positions with the container vessel extending in locked projecting position above the open top of the casing.

Fig. 3 is a side elevation taken at right angles to the showings in Figs. 1 and 2, and indicating only the part of the casing projecting above the ground, with the lid and container vessel in raised positions.

Fig. 4 is a view similar to that of Fig. 3, but at right angles to the latter, and showing the container lid in lowered position to cover the open top of the casing.

Fig. 5 is a separate perspective view of the locking rim-flange.

Fig. 6 is a similar view of the fixed rim-flange for the open top of the casing.

Fig. 7 is a detail sectional elevation of a means employed for securing the rim flanges to the open top of the casing.

In the drawings 1 indicates an open top casing suitable for the present purpose, shown as cylindrical but not necessarily of such shape, and its open top end is shown with an outwardly directed flange 2, and its bottom wall 3 is shown with a central aperture 4 to permit draining of water gathering in the casing, and a projecting external flange 5, which will prevent lifting of the casing when sunk into the ground, the appearance of the casing when thus sunk, being shown in Figs. 3 and 4.

The container vessel is indicated at 6, and is shown as cylindrical to correspond with the showing of a cylindrical casing, but may be of any shape that will fit and move within the casing 1. It desirably is of less depth than the depth of the casing, and in accordance with the present improvements, is provided with a plurality of guide ribs 7, 7, projecting outwardly and extending lengthwise of said casing in spaced relation around the outside periphery thereof. These guide ribs 7, 7, preferably extend below the bottom wall of said container vessel, as shown, to seat on the bottom wall of the casing when said vessel is in lowered position within said casing. And said guide ribs 7, 7, are adapted to centrally guide said container vessel in its movements in said casing, and according to the present improvements, each rib 7 has a locking notch 8 intermediate its length as shown, and the ribs 7 are widened below said notches as shown to form shoulders 9 for a purpose hereinafter described. A coil spring 10 is shown positioned between the bottom wall of container vessel 6, and the bottom wall of casing 1, and this spring 10 may be tensioned to merely counterbalance the weight of said container vessel 6, or sufficiently tensioned to exert a lifting force to raise said vessel 6 into projecting extension above the open top of casing 1.

The open top of casing 1 is shown with a rim-flange 15 encircling the same and extending inwardly around said open top and provided with guide slots 16, 16, equal in number to that of the ribs 7, 7, and spacedly arranged around the inner periphery of said flange in vertical alinement with said ribs and adapted to be slidingly engaged by the latter when the container vessel 6 is raised above the open top of said casing 1.

A locking rim-flange 20 of similar nature to rim-flange 15, is shown as adjustably mounted above the latter and extends inwardly around the periphery of the open top of casing 1, and is provided with guide slots 21 spacedly arranged around its inner periphery and equal in number to the guide slots 16 in rim-flange 15 which slots 21 may be positioned in vertical alinement with guide slots 16, or moved out of alinement therewith.

Fig. 7 indicates one means of securing the rim-flanges 15 and 20 to the flange 2 surrounding the open top of casing 1. Such means shown consisting of rivets 25 engaging through apertures in said flange 2, with apertures 17 in rim-flange 15 and slotted apertures 22 in rim-flange 20. It will be noted rivets 25 closely fit apertures in flange 2 and apertures 17 in rim-flange 15 to fixedly position said rim flange 15, and the diameter of the rivets 25 above rim flange 15 are enlarged and are of greater length than the thickness of rim flange 20 so the latter will be positively held but free to turn within the length of its slotted apertures 22, as by means of handle extension 23 of said rim flange 20.

The grave marker is shown in the form of a lid 30, hinged at 31 to casing 1, and when in closed position lying over rim flanges 15 and 20, and closing the open top of casing 1. This lid may be raised to permit projecting extension of container vessel 6, and the drawings show a convenient handle for this purpose. Such handle 32 is shown as a rod mounted in bearings on the under side of said lid 30 and having a bracket hook 33 at its end projecting beyond the periphery of lid 30. This handle 32 may be moved lengthwise in its bearings and held in such extended position as by a pin 34 engaging a lug 35 on the lid as by a partial rotation of said handle, so that the bracket hook 33 thereof may be used to support a wreath or basket or the like when the lid is in open position as shown in Fig. 2.

As above fully described, the nature and operation of the improvements will be readily understood. The flanges 5 of the casing extend outwardly and are covered by the earth in which said casing is buried, so it may not easily be removed or lifted by frost or the like. The guide-ribs 7 of the container vessel slidingly engaging in the alined guide slots 16 and 21 insure centered guided elevation of the container vessel without canting and are engaged by shifting movement of locking rim flange in either lowered position in casing 1, or extended projecting position above the open top of the latter. Shoulders 9 on the guide ribs 7 will engage against the underside of rim-flange 15 to prevent excessive projection or unauthorized removal of container vessel 6 from the casing 1. Coil spring 10 either counterbalances or exerts a positive lifting movement of container vessel 6 to facilitate raising the same for use as a flower holder, but is prevented from undue projection of said vessel by shoulders 9, as described, and is held in contracted position when the guide slots 21 of the locking rim flange 20 are turned out of alinement with the upper ends of the guide ribs 7 of the lowered container vessel 6. The handle 32 of hinged lid 30 both provides a convenient means for raising said lid and an extensible holder for wreaths, baskets and the like.

The details of the construction thus fully described may of course be varied and modified with the spirit of the invention as specifically defined in the following claims.

What I claim is:

1. A combined grave marker and flower holder, comprising an open top casing adapted to be sunk into the ground, a grave marker lid hinged to the open top of said casing, and a container vessel within said casing vertically movable therein from lowered position under the closed lid to extending position therefrom when the lid is raised, a plurality of projecting guide-ribs extending lengthwise in spaced relation around the outer periphery of said container vessel and having locking notches in the edges thereof intermediate their length, an inwardly extending fixed rim-flange encircling the open end of said casing and having guide slots in its inner periphery in alinement with the vertical guide-ribs on said container vessel, and a locking rim-flange adjustably secured to said fixed flange and having inner peripheral guide slots movable into alinement with the peripheral slots of said fixed rim to permit projecting extension movement of said container vessel and out of alinement with the latter and into engagement with the locking notches in said guide ribs to hold said container vessel in locked extended position.

2. In the construction set forth in claim 1, said container vessel being of less depth than said casing with the bottom wall thereof spaced from the bottom wall of said casing and the vertical guide-ribs of said container vessel extending below the same to seat on said casing bottom wall, a coil spring between said container and casing bottom walls biased to exert lifting tension against said container vessel, and shoulders on the vertical guide-ribs of said container vessel below the locking notches in said ribs, engageable against the under side of said fixed rim-flange to limit extending movement of said container vessel above the open top end of said casing.

3. In a combined grave marker and flower holder comprising an open top casing adapted to be sunk into the ground and enclosing a container vessel vertically movable therein to extending position above said open top with guide means to limit vertical movement of said container vessel, and locking means to hold said vessel in lowered position in said casing and in extended projected position, a marker lid hinged to said casing and swingable to closing position over the open top of said casing, and to raised open position above said open top, a handle for said marker lid comprising a longitudinally movable rod mounted transversely across the under side of said lid with a hooked bracket end projection beyond the periphery thereof, and a locking pin on said rod operated by a longitudinal and rotating movement of said rod to engage a locking lug on said lid to hold said hooked end in a projected extension beyond said lid periphery.

BENJAMIN D. COHN.

REFERENCES CITED

The following references are of record in the file of this patent:

UNITED STATES PATENTS

| Number | Name | Date |
| --- | --- | --- |
| 502,595 | St. George | Aug. 1, 1893 |
| 1,907,775 | Flook | May 9, 1933 |
| 2,099,329 | Comstock et al. | Nov. 16, 1937 |